July 3, 1928.
C. J. KLISS
1,675,808
PIPE JOINT
Filed Feb. 5, 1927
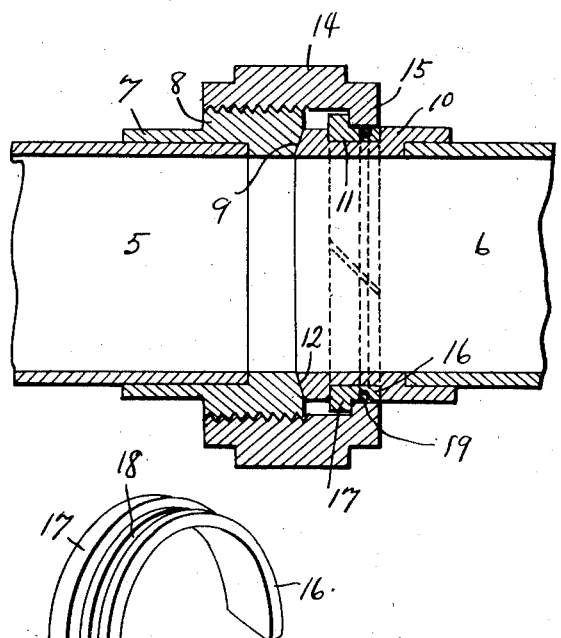
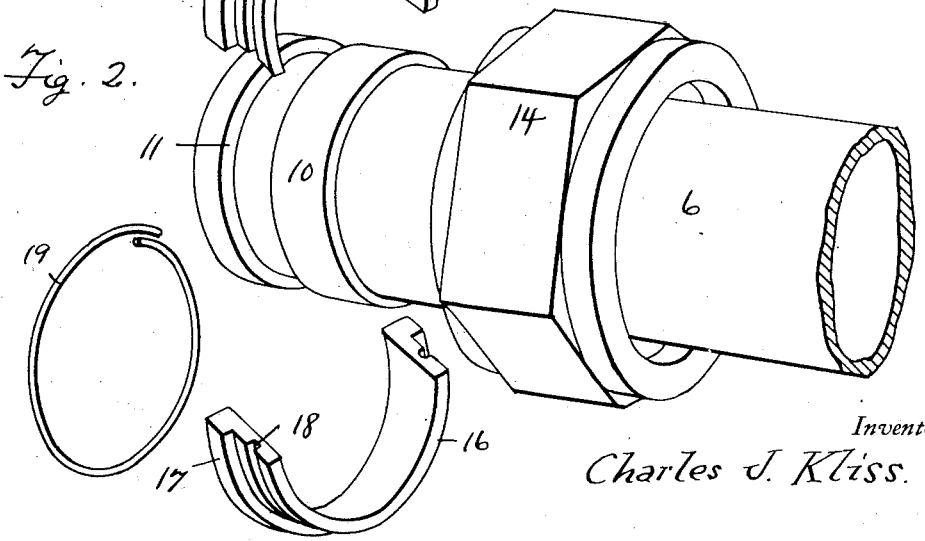
Inventor
Charles J. Kliss.
By *Clarence A. O'Brien*
Attorney Patented July 3, 1928.

1,675,808

UNITED STATES PATENT OFFICE.

CHARLES J. KLISS, OF SCRANTON, PENNSYLVANIA.

PIPE JOINT.

Application filed February 5, 1927. Serial No. 166,191.

The present invention relates to a pipe joint and has for its principal object to provide an exceedingly simple structure of this nature which has the advantage of quick assembly and disassembly and which may be put on or taken off in a few seconds without cutting the pipe or any part thereof.

A still further important object of the invention lies in the provision of a pipe joint of this nature which is easy to manipulate, thoroughly efficient and reliable in use, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1 is a longitudinal section through a pair of pipes joined together by the device forming the present invention, Fig. 2 is a detail perspective showing the joint with parts thereof disassembled.

Referring to the drawing in detail, it will be seen that numerals 5 and 6 denote two pipe structure to be joined together. On the adjacent end of the pipe section 5 there is welded or otherwise secured a sleeve 7 having an enlarged externally threaded end 8. The edge of this end 8 is beveled as is indicated at 9. On the adjacent end of the other pipe section 6 there is mounted a sleeve 10 formed in its exterior surface with an annular groove 11. The end edge of this sleeve 10 is beveled as at 12 to fit snugly within the beveled end 9. A nut 14 has an annular flange 15 projecting inwardly from one end thereof and is threaded adjacent the other end thereof internally for threadedly engaging the enlarged end 8. Ring sections, preferably two in number, are denoted by numerals 16 and are adapted to be seated in the annular groove 11. These ring sections have outwardly projecting flanges 17 and peripheral grooves 18 which mate together to form respectively an annular ridge and an annular groove. A spring packing split ring 19 is adapted to be received in the groove 18 to provide a water tight fit between the ring section 16 and the interior edge of the flange 15.

In assembling this joint the nut 14 is first placed in the position shown clearly in Figure 2, thus allowing the ring sections 16 to be placed in the groove 11 and the split ring 19 to be placed in the groove 18 for holding the sections 16 temporarily in place. The nut is then slid forwardly and is threadedly engaged with the end 8 at which time the flange 15 will engage flange 17 to draw the two sleeves 8 and 10 tightly together at their beveled edges 9 and 10 respectively.

It is thought that the construction, utility, and advantages of this joint will now be apparent to those skilled in this art without a more detailed description thereof. The present embodiment of the invention has been disclosed in detail merely by way of example since in actual practice it attains the features of advantage enumerated as desirable in the statement of the invention and the above description. It will be apparent that changes in the details of construction, in the sizes, and in the combination and arrangement of parts may be resorted to without departing from the spirit or scope of the invention as hereinafter claimed or sacrificing any of its advantages.

Having thus described my invention, what I claim as new is:—

A pipe joint of the class described, including a sleeve having an enlarged end provided with external threads and a beveled edge, a second sleeve having a beveled edge for engaging the first-mentioned beveled edge and provided with an annular exterior groove, ring sections receivable in said groove and formed with ribs and with grooves, a split ring receivable in the grooves of the ring sections to hold them assembled in the groove of the second sleeve and to form a packing gland, and a nut internally threaded at one end and at its other end provided with an internally extending annular flange to engage the rib when the threads thereof are engaged with the threads of the enlarged end of the first sleeve, said flange also engaging the packing split ring.

In testimony whereof I affix my signature.

CHARLES J. KLISS.